Oct. 23, 1951 R. E. WHITE 2,572,083

DELAYED SIGNAL GENERATOR

Filed Oct. 25, 1945 3 Sheets-Sheet 1

Inventor
ROGER E. WHITE

By Ralph L Chappell

Attorney

Oct. 23, 1951 R. E. WHITE 2,572,083

DELAYED SIGNAL GENERATOR

Filed Oct. 25, 1945 3 Sheets-Sheet 2

Inventor

ROGER E. WHITE

By Ralph L. Chappell

Attorney

Oct. 23, 1951 R. E. WHITE 2,572,083

DELAYED SIGNAL GENERATOR

Filed Oct. 25, 1945 3 Sheets-Sheet 3

Inventor
ROGER E. WHITE

By Ralph L. Chappell

Attorney

Patented Oct. 23, 1951

2,572,083

UNITED STATES PATENT OFFICE 2,572,083

DELAYED SIGNAL GENERATOR

Roger E. White, United States Navy

Application October 25, 1945, Serial No. 624,628

9 Claims. (Cl. 250—36)

(Granted under the act of March 3, 1883, as amended April 30, 1928; 370 O. G. 757)

This invention relates to signal generators and is directed to the problem of supplying an output signal responsively to an input signal after a delay interval.

Delayed signal generators are normally subject to timing inaccuracy resulting from spontaneous voltage variation within the generator network. The present invention avoids timing inaccuracy by providing a timing control voltage effectively free of spontaneous variation and thereby generating a delayed signal with high precision timing. The present invention provides the generation of a signal responsively to another signal with an adjustable time delay period and substantially free of delay variation.

It is accordingly an object of the invention to generate a delayed signal responsively to an input signal after a highly accurate timing period.

It is another object of the invention to generate a delayed signal after an adjustable timing period with high timing precision.

The invention will be further described with reference to the exemplary embodiments shown in the drawings, in which.

The delayed output signal supplied by the generator of the present invention is developed responsively to an input signal of the pulse type. Such signals are frequently encountered in various types of transmission, communication, or control networks, and may be of a uniformly recurrent nature, frequency modulated, or of isolated distribution. A source of such signal has been indicated in the system of Fig. 1 as pulse generator 1. It may be assumed, particularly in connection with the detailed diagram of Fig. 2, that the input signal controlling the operation system is of positive polarity.

Figure 1:
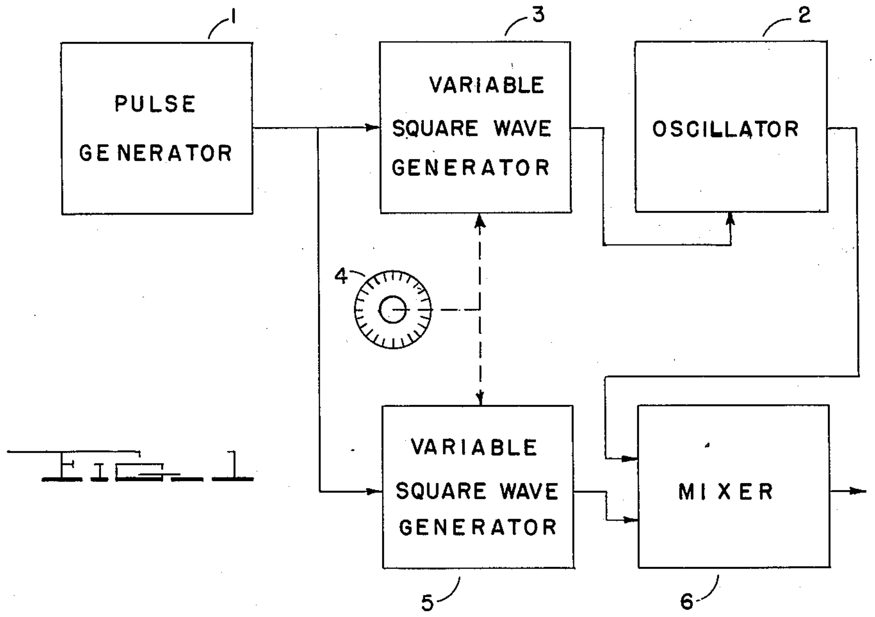
Fig. 1 shows in block diagram a system embodying the invention.

The system of Fig. 1 supplies a delayed pulse after a timing interval which may be selected as desired according to the application of the device. This output signal is obtained from a recurrent signal generator which operates to supply a series of output signals generated with a predetermined and constant phase relationship with respect to the input signal. These signals may be made as close together as desired in accordance with the application of the invention, and thereby afford an adjustably delayed signal appearing with high time precision at any desired interval after the input pulse.

In the system of Fig. 1, the generator of the recurrent signal is shown as oscillator 2.

In order to effect the predetermined phase relationship between the incoming signal and the recurrent signal generated within the system, oscillator 2 of Fig. 1 may be maintained in a normally inoperative condition and thrown into operation responsively to the incoming signals. Inasmuch as the time delay between the incoming signal and the operation of the oscillator, and the phase in which oscillation is initiated are both constant from cycle to cycle, the required phase relation is thereby effected. Operation of oscillator 2 is controlled by a variable square wave generator 3 which, responsively to the input signal, effects operation of the oscillator for a selectable timing period under control 4. The timing period established by the variable square wave generator 3 includes a series of recurrent cycles supplied by the oscillator, and the last of these cycles constitutes the delayed output signal.

The recurrent signals supplied by the oscillator up to the last signal are eliminated to provide the desired time delay. In the system of Fig. 1, this is accomplished through the action of a second variable square wave generator 5 which supplies a control signal having a duration shorter than that of generator 3 by an amount not more than the period of the recurrent signal generated by oscillator 2. This signal is applied to a mixer circuit 6 in order to prevent the transmission of the undesired signals from the oscillator.

Variable square wave generator 5 is under coordinate control of dial 4 with generator 3. The control elements operated by dial 4 are effective to vary the timing intervals of the two variable square wave generators simultaneously over the desired range while maintaining their difference constant.

It will accordingly be seen that the system of Fig. 1 causes the oscillator to generate a plurality of signals, the last of which appears at precisely the desired time delay interval, together with a transmission circuit eliminating all except the desired signals.

Figure 2:
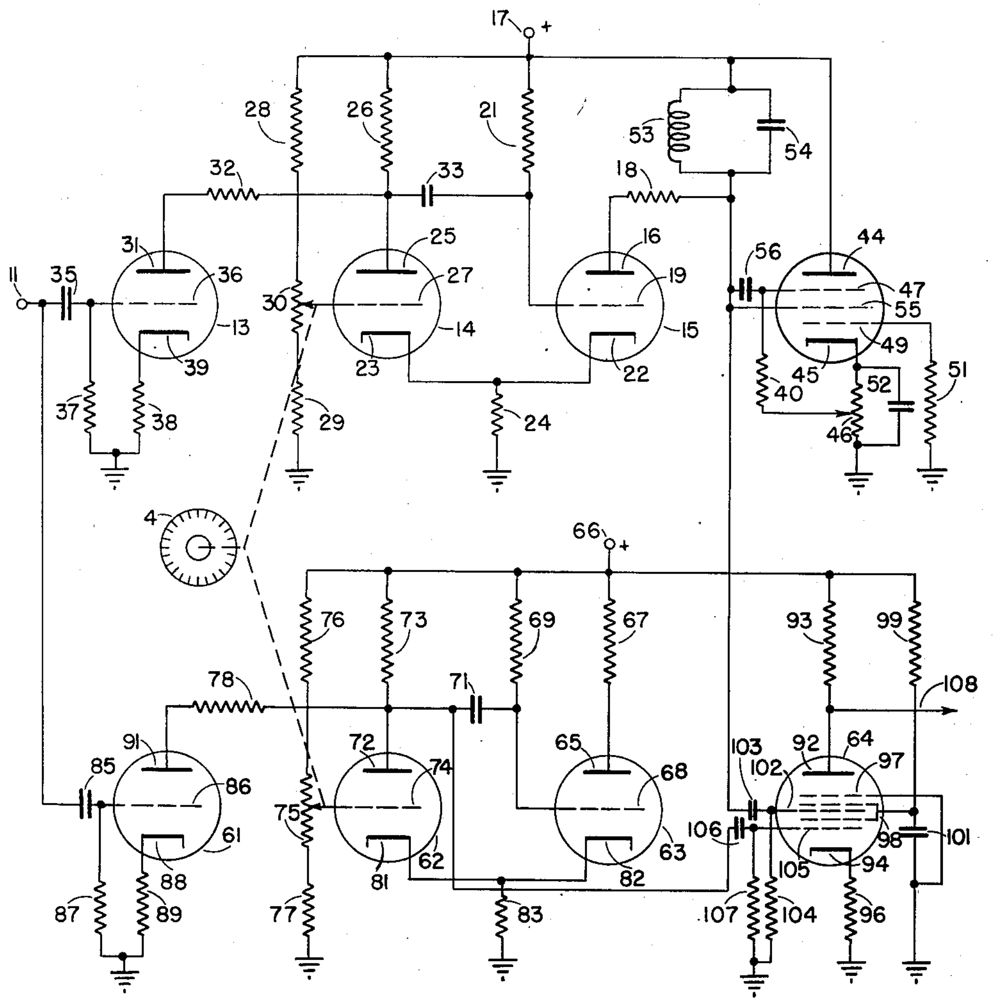
Fig. 2 shows in schematic diagram components suitable for the system shown in Fig. 1.

Exemplary circuit components for use in the system of Fig. 1 are shown in the schematic diagram of Fig. 2. The positive input signals to which the system is responsive may be introduced at terminal 11. The variable square wave generator 3 as shown in Fig. 1 is constituted by tubes 13, 14 and 15 and their associated network. Tubes 14 and 15 are arranged in a circuit effecting alternate conduction between the tubes, and the circuit is operative after being tripped to reestablish its quiescent condition after a timing interval during which the oscillator is in operation. In the circuit shown, tube 15 is normally conducting. Its anode 16 is returned to a positive potential supply 17 through anode load resistor 18. Its control grid 19 receives positive bias from source 17 through resistor 21. Cathode 22 of tube 13 is directly connected to cathode 23 of tube 14 and these cathodes are returned to ground through a common resistor 24. Anode 25 of tube 14 is connected to the positive potential supply through resistor 26. Control grid 27 of tube 14 receives a controllable positive bias from potentiometer 30 connected in series with resistance 28 and 29 between the positive potential supply and ground. The potential applied to control grid 27 is considerably lower than that present on control grid 19, so that tube 15 is normally in conduction.

This circuit is tripped by the injected voltage appearing at terminal 11 through the operation of tube 13. Anode 31 of this tube is connected through resistor 32 to anode 25 of tube 14, so that these two tubes are provided in common with anode load resistor 26. Anode 25 of tube 14 is coupled to control grid 19 of tube 15 through condenser 33. The positive input impulses are applied at terminal 11 and coupled through condenser 35 to control grid 36 of tube 13. This control grid is returned to ground by resistor 37, and cathode resistor 38 is connected to cathode 39 in order to provide an operating bias on this tube. Under the positive pulses applied to the control grid of tube 13, a resulting negative swing appears at anode 31 thereof, and thus a similar negative impulse is developed at anode 25 of tube 14. The latter voltage variation is transmitted through coupling condenser 33 and applied at control grid 19 of tube 15. This terminates conduction in this tube, and the cathodes 22 and 23 of tubes 15 and 14 immediately undergo a potential drop. This continues until cathode 23 falling toward the potential of control grid 27 of tube 14, establishes conduction in that tube and reaches an equilibrium bias determined by current in cathode resistor 24. The resulting conduction of tube 14 maintains a voltage drop at anode 25 through the common plate resistor 26. Thus, an initial negative impulse was established at control grid 19 of tube 15 through condenser 33 and grid 19 is thereafter maintained at a lower potential through the resulting voltage drop effected in resistor 26 under conduction of tube 14. Consequently tube 15 does not regain conduction immediately after the impulse, and is maintained under a blocking bias resulting from the drop in potential of anode 25 until discharge of condenser 33 is effected through resistors 21 and 26 to raise the potential of control grid 19 to reestablish conduction in tube 15. The amount of voltage discharge required of condenser 33 before recovery of tube 15 is determined by the drop at anode 25, and this in turn is a function of the control grid bias on tube 14. The bias on grid 27 is controlled through dial 4 operating potentiometer 30.

The operation of the variable square wave generator described is employed to control oscillator 2. In the circuit of Fig. 2, the recurrent signal is generated in substantially sine wave worm by a transitron oscillator including tube 43. This oscillator is normally quiescent but is permitted to operate during the time while tube 15 is blocked. As explained above, this timing interval may be controlled as desired from dial 4 on potentiometer 30. The oscillator network includes tube 43 whose anode 44 is connected to the source of positive potential. Cathode 45 is returned to ground through potentiometer 46, to which suppressor grid 47 is connected through resistor 40. Control grid 49 is returned to ground by resistor 51. Potentiometer 46 is bypassed by condenser 52, and the cathode network establishes a desired operating level of tube 43. The oscillator circuit comprises inductance 53 and condenser 54, which are connected between the positive potential supply and grid 47 and 55. Coupling condenser 56 is provided so that the proper quiescent bias may be established on grid 47.

The operation of this transitron oscillator will be well understood and is effected through the negative resistance offered by the network. Under conduction of tube 15, this resistance is overcome through the shunting effect of the tube, but when the tube is blocked the oscillator network immediately goes into operation, and is keyed off in definite phase relation to the blocking of tube 15 under the resulting current disturbance in inductance 53, through which the plate current of tube 15 passes. By variations in the timing interval of the generator described, the oscillator network may be caused to supply any desired number of cycles, the last of the recurrent signals appearing with the desired time delay after the input signal. It will be understood, of course, that the oscillator frequency controlled by inductance 53 in combination with condenser 54 may be selected to give as close spacing between succeeding impulses as is desirable for any particular application.

The circuit components constituting variable square wave generator 5 and mixer 6 shown in Fig. 1 will now be described. These components operate to suppress all but the last cycle supplied by the oscillator, and include a variable square wave generator comprising tubes 61, 62 and 63 together with their associated network, and mixer tube 64.

The operation of tubes 61, 62, 63 is similar to that of tubes 13, 14 and 15. Anode 65 of tube 63 is returned to a positive potential source by resistor 67. Control grid 68 of tube 63 is positively biased through resistor 69, and is coupled through condenser 71 to anode 72 of tube 62. The latter tube is provided with a plate resistor 73, and its control grid 74 receives an adjustable positive bias from potentiometer 75 which is connected in series with resistors 76 and 77 between the positive potential source and ground. The anode 91 of tube 61 is connected through resistor 78 to anode 72 of tube 62. Cathodes 81 and 82 of tubes 62 and 63 respectively are returned to ground through common resistor 83. Under quiescent conditions tube 63 is normally conducting. The positive signal applied at terminal 11 is coupled through condenser 85 to control grid 86 of tube 61, this grid being returned to ground through resistor 87. Cathode 88 is also returned to ground through resistor 89. The negative swing developed at anode 91 of tube 61 responsively to the positive input signal is also effective in developing a negative swing at anode 72 which is applied to control grid 68 of tube 63 through coupling condenser 71. Consequently tube 63 is blocked, and is then maintained in that condition through the resulting conduction of tube 62, in the manner described above in connection with tubes 13, 14 and 15. Consequently, under the variable setting of potentiometer 75, a second squarewave is generated responsively to the input signal and this voltage is applied as a control potential in the mixer network. Potentiometer 75 is also controlled from dial 4 and through the proper selection of values of the resistors of the grid networks of tubes 14 and 62 the two square waves may be simultaneously varied throughout the desired range while maintaining a substantially constant difference therebetween. As pointed out above, this difference will not exceed the period of the recurrent signal supplied from oscillator 3 so that the output channel will deliver only a single signal.

The mixer network includes tube 64 whose anode 92 is provided with load resistor 93. This tube operates normally under a small bias developed on cathode 94 through resistor 96. In this tube the suppressor grid 97 is directly grounded, and screen grid 98 receives positive bias from resistor 99 which is stabilized by bypass condenser 101. The oscillator output signal is applied to grid 102 through coupling condenser 103. This grid is returned to ground through resistor 104. The variable square wave supplied by the generator comprising tubes 61, 62 and 63 is obtained from anode 72 of tube 62. This signal is of negative polarity and is applied to control grid 105 through coupling condenser 106. Grid 105 is returned to ground through resistor 107. Thus, during the timing interval defined by the second square wave generator, tube 64 is cut off, and the initial recurrent signals supplied from the oscillator are not transmitted to the output channel comprising lead 108 connected to anode 92 of tube 64. Since, however, the negative voltage developed at anode 72 terminates one period prior to termination of the oscillator operation, the output channel is rendered operative to deliver the final signal from the oscillator on lead 108. With the generation of this final signal, operation of the oscillator is terminated under control of the network including tubes 13, 14 and 15, and consequently the desired result is achieved.

Figure 3:
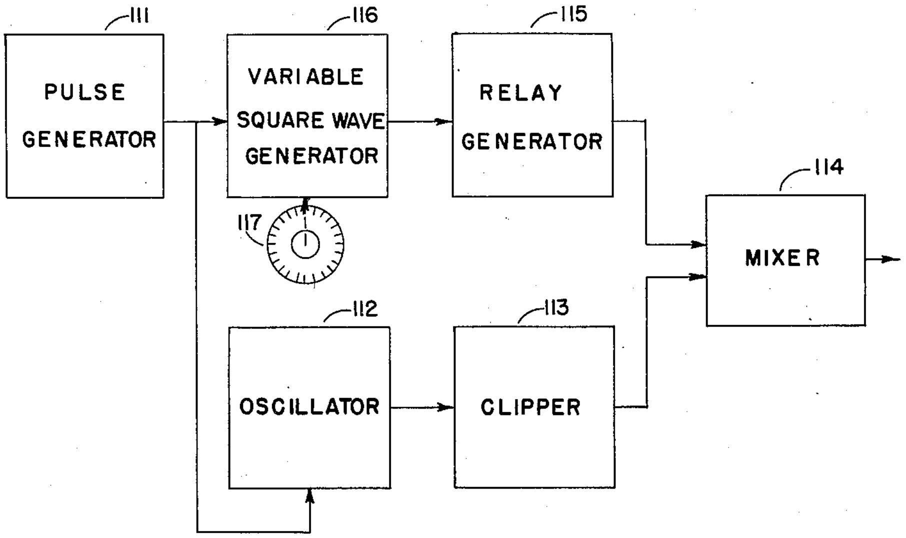
Fig. 3 shows in block diagram another system embodying the invention.

A second embodiment of the invention is illustrated in the system of Fig. 3. In that system, the input pulses to which the device is responsive are generated by a source shown as pulse generator 111. The recurrent signals are developed by oscillator 112 which is normally quiescent but is thrown into operation for a limited time period responsively to the input pulses. The output of this oscillator is shaped in a clipping circuit 113 to supply recurrent output impulses of very short time duration. These impulses are applied to a normally blocked mixer circuit 114. Mixer circuit 114 is operated to transmit a selected oscillator signal through the operation of a relay generator 115. This generator supplies a control signal having a duration not greater than the period of the recurrent oscillator frequency. Generator 115 is thrown into operation after a predetermined time delay interval through variable square wave generator 116 whose operation may be controlled by dial 117. The circuit differs from Figure 1 in that the recurrent signal generator need not terminate its operation with the output signal.

Figure 4:
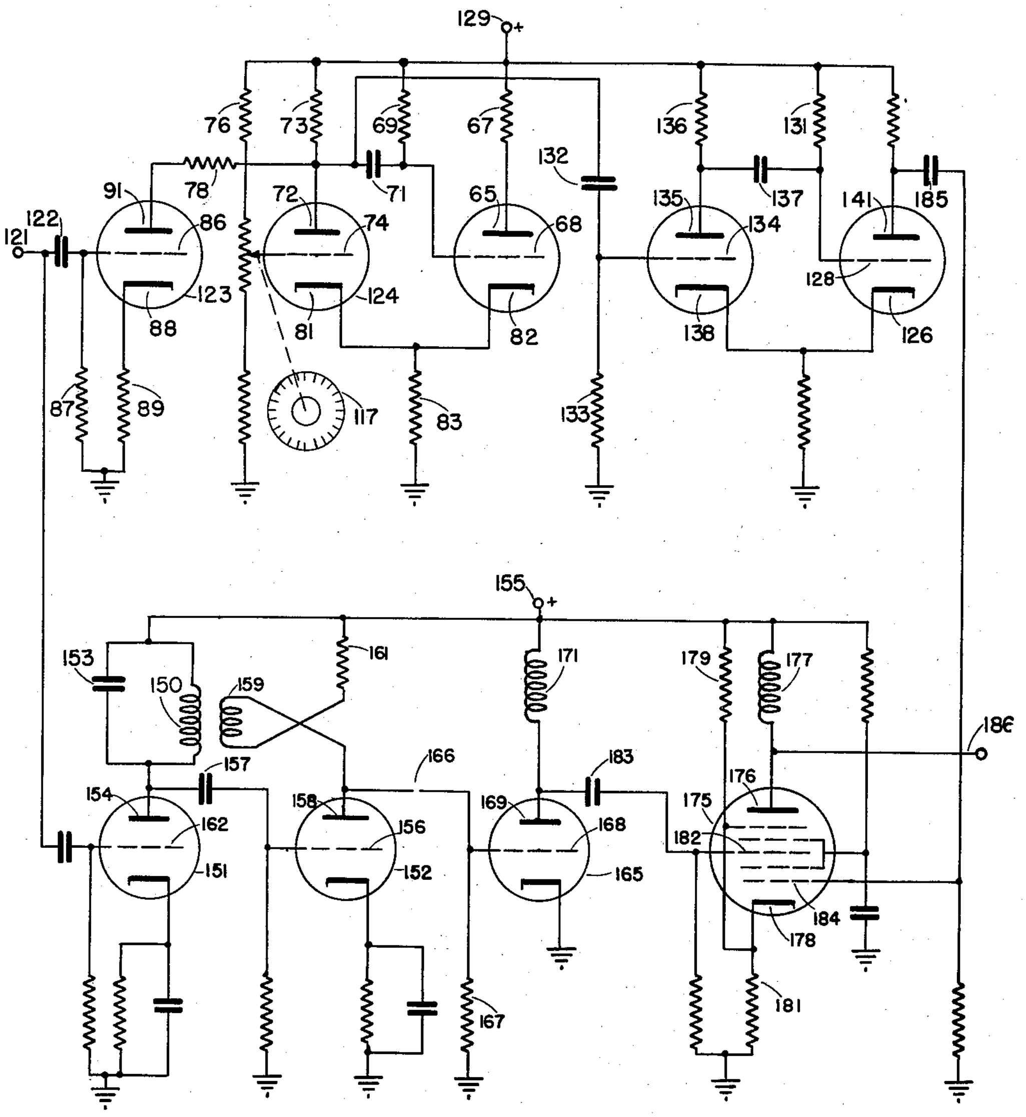
Fig. 4 shows in schematic diagram components suitable for use in the system of Fig. 3.

Circuit components suitable for use in the system of Fig. 3 are shown in Fig. 4. The positive input pulses which may be supplied by a source such as pulse generator 111 are applied at terminal 121. These pulses are applied through coupling condenser 122 to a variable square wave generator including comprising tubes 123, 124, and 125 and their associated networks. This variable square wave generator is similar in all respects to that described in connection with tubes 61, 62 and 63 of Fig. 2. Consequently, components in this network corresponding to those in Fig. 2 have been given the same reference numerals. Potentiometer 75 is controlled by dial 117 and the circuit is operative to supply a negative output signal swinging positive after a time delay determined by the setting of potentiometer 75. This signal is delivered to a relay generator including tubes 126 and 127. These tubes are also arranged for alternate conduction, and through the operation of positive bias on control grid 128 of tube 126, from a positive potential source 129 by resistor 131, tube 126 is normally maintained in conduction.

The signal supplied at anode 72 of tube 124 consists of a negative swing accompanying the injection of the positive pulse at terminal 121, followed after a timing period by a positive swing when that network reacquires its relaxed condition. Since tube 127 is normally blocked, the initial negative control voltage applied to its control grid 134 produces no effect on the relay generator. After the timing period is complete and tube 124 becomes blocked, its anode voltage shift is differentiated in the network comprising condenser 132 and resistor 133 to apply a positive impulse on grid 134. This positive impulse throws tube 127 into conduction and its anode 135 undergoes a negative voltage shift resulting from the current voltage drop across its load resistor 136. This voltage drop is applied to control grid 128 of tube 126 through coupling condenser 137. Tube 126 is maintained blocked until condenser 137 discharges sufficiently to permit conduction in tube 126. The discharge time constant of condenser 137 and its associated network is selected so that grid 128 recovers its conductive bias within a period not longer than the period of the recurrent signal supplied by the oscillator to be described below. When tube 126 becomes conductive, it immediately begins to cut off tube 127 through a resulting rise in potential of cathode 138. Through the regenerative coupling back from anode 135 to grid 128 a very sharp throw-over is effected.

The components of Fig. 4 thus far described generate a positive otuput signal at anode 141 at tube 126 which is initiated a controllable time after the receipt of the positive impulse at terminal 121.

Tubes 151 and 152 comprise the oscillator network 112 shown in Fig. 3. The network is normally quiescent, and is shocked responsively to the input pulse signal to furnish a damped wave train terminating before the subsequent output pulse. The oscillatory circuit comprises inductance 150 and condenser 153 in the plate circuit of tube 151. The latter operates in a medium current range suddenly varied by the input pulse. Anode 154 carries the resulting oscillation which is coupled to grid 156 of tube 152 through condenser 157. Tube 152 is overdriven to supply a pulse type output signal, coupled to coil 150 in regenerative phase from coil 159, and fed to a peaking tube 165. The regenerative coupling will be sufficient to maintain oscillation for the desired period.

Anode 169 is coupled to the positive potential supply through a small inductance 171. The latter is operative to develop a short voltage swing on the rapidly changing current waveform and thus supplies very short impulse signals appearing at a recurrence rate determined by the oscillator. This signal is coupled to the output mixer stage.

The mixer stage includes pentagrid tube 175, provided with anode 176 returned to a source of positive potential through a small inductance 177. Cathode 178 operates under positive bias developed by resistances 179 and 181 connected between the positive supply and ground. Consequently the mixer tube is normally cut off. The recurrent timing signal is applied to grid 182 from anode 169 of tube 165 through coupling condenser 183. No resulting signal, however, is developed at anode 176 in the absence of an applied positive potential at control grid 184.

The control signal is derived from the relay generator after a selectable time delay, and for this purpose anode 141 of tube 126 is coupled to grid 184 through condenser 185. Inasmuch as the duration of this positive control signal does not exceed the recurrent signal period, only a single output pulse is developed at anode 176, and this output signal is delivered at terminal 186.

It will therefore be seen that under control 117 a single output signal is delivered at terminal 186 after a selectable time delay, and that this signal is free of random voltage variation, being precisely timed by the oscillator network.

It will be understood that the embodiments of the invention shown and described are exemplary only, and that the scope thereof will be ascertained with reference to the appended claims.

The invention described herein may be manufactured and used by or for the Government of the United States of America without the payment of any royalties thereon or therefor.

What is claimed is:

1. A delayed signal generator comprising an input signal channel adapted to receive a pulse signal, normally quiescent oscillator responsive to the input signal operative to supply a recurrent output signal in predetermined phase relation thereto, a blocked output channel fed by the oscillator, and control means for the output channel operative responsively to the input signal to unblock the same after a time delay period to supply a delayed output signal from the oscillator.

2. A delayed signal generator comprising an input signal channel adapted to receive a pulse signal, normally quiescent oscillator responsive to the input signal operative to supply a recurrent output signal in predetermined phase relation thereto, a normally blocked output channel fed by the oscillator, control means for the output channel operative responsively to the input signal to unblock the same after a time delay period to supply a delayed output signal from the oscillator, and means becoming operative after the delayed output signal to terminate operation of the oscillator.

3. A delayed signal generator comprising an input signal channel adapted to receive a pulse signal, normally quiescent oscillator means operative to supply a recurrent signal, control means for the oscillator operative responsively to an input signal to initiate operation of the oscillator in predetermined phase relation to the input signal, a normally blocked output channel fed by the oscillator, and control means for the output channel becoming operative responsively to the input signal after a timing interval to unblock the same to supply a delayed output signal.

4. A delayed signal generator comprising an input signal channel adapted to receive a pulse signal, normally quiescent oscillator operative to supply a recurrent signal, oscillator control means becoming operative responsively to input signal to initiate operation of the oscillator in predetermined phase relation to the input signal, a normally blocked output channel fed by the oscillator, control means for the output channel operative responsively to the input signal to unblock the same after a timing interval to supply a delayed output signal, and means becoming operative after the delayed signal to terminate oscillation of the oscillator.

5. A delayed signal generator comprising an input signal channel adapted to receive a pulse signal, normally quiescent oscillator means operative to supply a recurrent signal, means for effecting operation of the oscillator during an adjustable timing interval, an output channel fed by the oscillator, control means for the output channel operative to block the same during an adjustable timing interval shorter than the oscillator operating interval, and means for initiating operation of the oscillator and of the output channel blocking means responsive to an input channel signal whereby a delayed signal is supplied from the oscillator through the output channel.

6. A delayed signal generator comprising an input signal channel adapted to receive a pulse signal, oscillator means operative to supply a recurrent signal, means for effecting operation of the oscillator during an adjustable timing interval, an output channel fed by the oscillator, control means for the output channel operative to block the same during an adjustable timing interval shorter than the oscillator operating interval, and means for initiating operation of the oscillator and of the output channel blocking means responsive to an input channel signal whereby a delayed signal is supplied from the oscillator through the output channel, and means for adjusting simultaneously the oscillator operating period and the output channel blocking period while maintaining their difference substantially constant.

7. A delay signal generator comprising an input signal channel adapted to receive a pulse signal, normally quiescent oscillator operative to supply a recurrent output signal responsive to the input signal and initiated in predetermined phase relation thereto, a normally blocked output channel fed by the oscillator, control means for the output channel responsive to an input channel signal operative to unblock the output channel after a timing interval for a period shorter than the recurrent signal period, whereby one of said signals is supplied at the output channel.

8. A delayed signal generator comprising an input signal channel adapted to receive a pulse signal, normally quiescent oscillator responsive to the input signal operative to supply a recurrent output signal in predetermined phase relation thereto, a normally blocked output channel fed by the oscillator, timing means operative to supply an output signal after a selectable time delay, control means therefor operative to initiate the timing period responsively to an input channel signal, relay generator means operative to supply an unblocking signal to the output channel responsively to operation of the timing means whereby a signal is delivered to the output channel from the oscillator.

9. A delayed signal generator comprising an input signal channel adapted to receive a pulse signal, normally quiescent oscillator responsive to the input signal operative to supply a recurrent output signal in predetermined phase relation thereto, a normally blocked output channel fed by the oscillator, timing means operative to supply an output signal after a selectable time delay, control means therefor operative to initiate the timing period responsively to an input channel signal, relay generator means operative to supply an unblocking signal of shorter time duration than the recurrent signal period to the output channel responsively to operation of the timing means whereby a signal is delivered to the output channel from the oscillator.

ROGER E. WHITE.

REFERENCES CITED

The following references are of record in the file of this patent:

UNITED STATES PATENTS

| Number | Name | Date |
|---|---|---|
| 2,153,202 | Nichols | Apr. 4, 1939 |
| 2,266,668 | Tubbs | Dec. 16, 1941 |
| 2,272,070 | Reeves | Feb. 3, 1942 |